US009160979B1

(12) United States Patent
Ulmer (10) Patent No.: US 9,160,979 B1
(45) Date of Patent: Oct. 13, 2015

(54) DETERMINING CAMERA POSITION FOR A PHOTOGRAPH HAVING A DISPLACED CENTER OF PROJECTION

(75) Inventor: John E. Ulmer, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 524 days.

(21) Appl. No.: 13/118,065

(22) Filed: May 27, 2011

(51) Int. Cl.
*H04N 7/18* (2006.01)

(52) U.S. Cl.
CPC ........................................ *H04N 7/18* (2013.01)

(58) Field of Classification Search
CPC ..................... G06T 2207/30244; G06T 15/00; G06F 3/042; H04N 7/18
USPC ...................... 348/42, 135; 382/106
See application file for complete search history.

(56) References Cited

U.S. PATENT DOCUMENTS

| 5,259,037 | A | * | 11/1993 | Plunk | 382/154 |
| 5,699,444 | A | * | 12/1997 | Palm | 382/106 |
| 5,745,126 | A | * | 4/1998 | Jain et al. | 382/154 |
| 6,046,745 | A | * | 4/2000 | Moriya et al. | 345/420 |
| 6,271,855 | B1 | * | 8/2001 | Shum et al. | 345/427 |
| 6,591,005 | B1 | * | 7/2003 | Gallagher | 382/154 |
| 6,674,902 | B1 | * | 1/2004 | Kondo et al. | 382/199 |
| 6,710,775 | B1 | * | 3/2004 | Tulman | 345/473 |
| 6,771,276 | B1 | * | 8/2004 | Highsmith et al. | 345/619 |
| 6,963,825 | B1 | * | 11/2005 | Morikawa et al. | 703/2 |
| 7,239,331 | B2 | | 7/2007 | Chernichenko et al. | |
| 7,239,752 | B2 | * | 7/2007 | Neumann et al. | 382/201 |
| 7,352,386 | B1 | * | 4/2008 | Shum et al. | 348/42 |
| 7,720,276 | B1 | * | 5/2010 | Korobkin | 382/154 |
| 8,310,534 | B2 | * | 11/2012 | Tian et al. | 348/92 |
| 8,350,850 | B2 | * | 1/2013 | Steedly et al. | 345/420 |
| 8,358,342 | B2 | * | 1/2013 | Park | 348/143 |
| 8,416,237 | B1 | * | 4/2013 | Jain | 345/420 |
| 8,531,473 | B2 | * | 9/2013 | Tzur et al. | 345/582 |
| 8,675,951 | B2 | * | 3/2014 | van den Hengel et al. | 382/154 |
| 2005/0237385 | A1 | * | 10/2005 | Kosaka et al. | 348/42 |
| 2005/0248539 | A1 | * | 11/2005 | Morrison et al. | 345/173 |
| 2008/0056536 | A1 | * | 3/2008 | Hildreth et al. | 382/103 |

(Continued)

FOREIGN PATENT DOCUMENTS

WO  PCT/IBS96/00424  *  3/1996  ............... G01C 3/00

OTHER PUBLICATIONS

"Using Vanishing Point to Edit Images in Perspective," (2005) Retrieved from the Internet on Apr. 21, 2011. URL:http://www.adobe.com/designcenter/photoshop/articles/phs9avrvanpt.html.

(Continued)

*Primary Examiner* — Christopher S Kelley
*Assistant Examiner* — Deirdre Beasley
(74) *Attorney, Agent, or Firm* — Sheridan Ross P.C.

(57) ABSTRACT

An image depicting an object has a center that is not on an optical axis of a camera used to capture the image. The image is on an image plane, and the object is in an object space. A method implemented for automatically determining the position of the camera relative to the object includes displaying the image via a user interface, receiving vanishing point information from the user interface, such that the vanishing point data indicates a respective location on the image plane of each of a first vanishing point, a second vanishing point, and a third vanishing point, and automatically determining the position of the camera based on the first vanishing point, the second vanishing point, and the third vanishing point.

22 Claims, 6 Drawing Sheets

(56) References Cited

U.S. PATENT DOCUMENTS

2008/0260256 A1   10/2008  Zeng et al.
2009/0146972 A1*  6/2009  Morrison et al. ............. 345/175
2009/0268214 A1* 10/2009  Lucic et al. .................. 356/614
2011/0063435 A1*  3/2011  Seko ............................. 348/135
2011/0115922 A1*  5/2011  Shimizu ........................ 348/188
2012/0176491 A1*  7/2012  Garin et al. .................. 348/113
2013/0162838 A1*  6/2013  Huang et al. ................. 348/169

OTHER PUBLICATIONS

Tutvid.com Tutorials, (A Quicktime Video) Retrieved from the Internet on Apr. 21, 2011: URL:http://www.tutvid.com/tutorials/photoshop/tutorials/vanishingPoint.php.

Chopra, "Google SketchUp 8 for Dummies," Wiley Publishing, Inc., Hoboken, NJ, Chapter 8 (2011).

* cited by examiner

FIG. 7

DETERMINING CAMERA POSITION FOR A PHOTOGRAPH HAVING A DISPLACED CENTER OF PROJECTION

FIELD OF THE DISCLOSURE

This disclosure relates to determining the position of a camera relative to objects in a photograph.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Today, modeling software, various map services, and other applications utilize photographs of buildings, structures such as bridges, for example, and other objects. In many of these applications, it is desirable to determine where the camera was positioned relative to objects in a photograph when the photograph was taken.

In a typical photograph, the optical axis of the camera passes through the center of the photograph, and accordingly the camera is positioned somewhere along a line orthogonal to the center of the photograph. However, in some situations, the optical axis of the camera does not pass through the center of the photograph.

SUMMARY

In an embodiment, a method implemented in a computing device for automatically determining a position of a camera relative to an object depicted in an image and captured using the camera, where the object is in an object space, the image is on an image plane, and a center of the image is not on an optical axis of the camera, includes causing the image to be displayed via a user interface of the computing device, receiving vanishing point data from the user interface, where the vanishing point data indicates a respective location on the image plane of each of a first vanishing point, a second vanishing point, and a third vanishing point, and automatically determining the position of the camera based on the first vanishing point, the second vanishing point, and the third vanishing point.

In another embodiment, a method implemented in a computing device includes receiving first data indicative of a location of a first vanishing point on an image plane, where the image plane includes an image of an object, receiving second data indicative of a location of a second vanishing point on the image plane, receiving third data indicative of a location of a third vanishing point on the image plane, automatically determining an orthocenter of a vanishing point triangle defined by the first vanishing point, the second vanishing point, and the third vanishing point, automatically determining a position of a camera used to capture the image, where the camera is disposed on an optical axis orthogonal to the image plane and intersecting the image plane at the orthocenter of the vanishing point triangle. Further, determining the position of the camera includes determining a distance between the camera and the orthocenter of the vanishing point triangle along the optical axis.

In another embodiment, a tangible non-transitory computer-readable medium has instructions stored thereon that, when executed by one or more processors, cause the one or more processors to cause an image depicting an object to be displayed via a user interface of a computing device, such that the object is in an object space, the image is on an image plane, and a center of the image is not on an optical axis of a camera used to capture the image, receive vanishing point data from the user interface, where the vanishing point data indicates a respective location on the image plane of each of a first vanishing point, a second vanishing point, and a third vanishing point, and determine a position of the camera relative to the object depicted in the image based on the first vanishing point, the second vanishing point, and the third vanishing point.

DETAILED DESCRIPTION

In general, an image processing system that implements the techniques of the present disclosure allows a user to efficiently determine where the camera was positioned to capture an image in which the geometric center does not correspond to the center of projection. In an example embodiment, the image depicts an object that includes mutually orthogonal lines in the corresponding object space (such as a building, for example). The user inspects the image and indicates three vanishing points by drawing respective pairs of lines over the image using an interactive user interface. In particular, for each vanishing point, the user selects a pair of lines that are parallel in the object space but intersect at the corresponding vanishing point on the plane that contains the image, i.e., the image plane. One, two, or all three vanishing points may be outside the boundaries of the image on the image plane. In response to the user input and a corresponding user command, for example, the image processing system determines the locations of the three vanishing points and, using the determined locations of the three vanishing points, automatically determines where the optical axis of the camera intersects the image plane. The image processing system then determines the distance between the camera and the image plane along the optical axis the camera to determine the position of the camera relative to the one or more objects in the object space. To this end, in at least some of the embodiments, the image processing system operates according to an assumption that the camera has no camera lens distortion other than perspective foreshortening.

Figure 1:
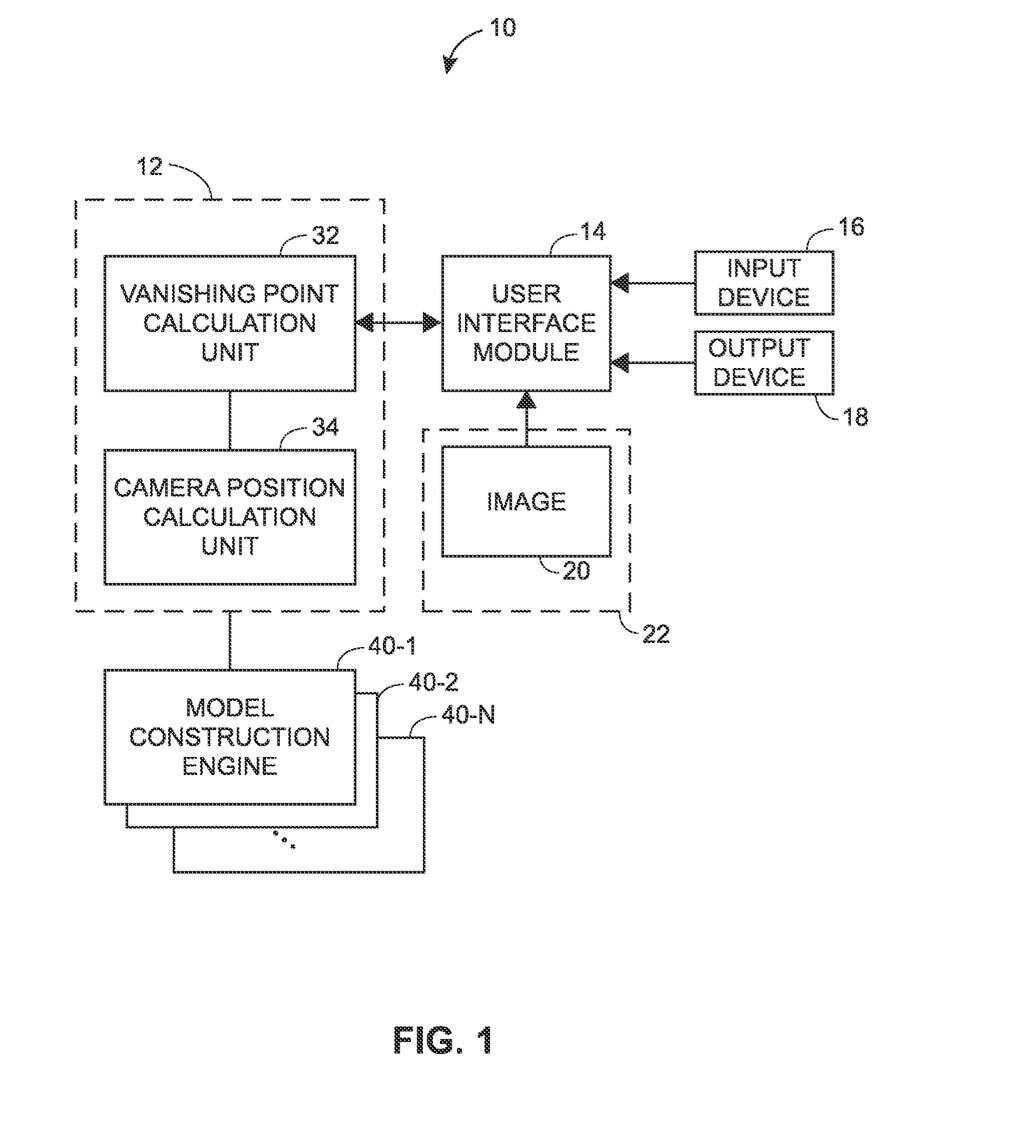
FIG. 1 is a block diagram of an image processing system that automatically determines the position of a camera relative to one or more objects depicted in a photograph having a displaced center of projection, according to an embodiment.

Referring to FIG. 1, in an embodiment, an image processing system 10 includes an image processing engine 12 coupled to a user interface (UI) module 14 that in turn is coupled to at least one an input device 16 and at least one output device 18. Depending on the embodiment, the input device 16 may include one or more of a mouse, a touchpad, a keyboard, a touch screen, a voice input device, etc., and the output device 18 may include a computer monitor, a touchscreen, etc. The image processing engine 12 and the UI module 14 may be implemented as computer programs executable by a processor of a computing device such as a personal computer that also includes, or is directly or indirectly coupled to, the input device 16 and the output device 18. However, in other embodiments, the image processing engine 12 is implemented on one or several servers disposed on a network (e.g., in a cloud), and the UI module 14 is implemented in a workstation coupled to the one or several servers via a network such as the Internet. In general, various components of the image processing system 10 can be implemented within one computing device or distributed among multiple computing devices in any suitable manner.

An image 20, which may be a digital photograph, a digitized film-based photograph, a frame in a video recording, etc., is stored as data in a memory module 22. The format in which the image 20 is stored may be, for example, TIF, PNG, JPG, GIF, or any other suitable format. Depending on the implementation, the memory module 22 may reside in a computing device in which the image processing engine 12 is implemented, a database implemented in a server to which the image processing engine 12 and the UI module 14 are coupled via a network, a portable storage device, etc. The memory 22 in general may store any desired number of images, from among which a user can select the image 20.

In operation, the UI module 14 interacts with the input device 16 and the output device 18 to provide an interactive user interface to the user for such operations as, for example, selecting an image 20, inspecting the image 20, providing input indicative of a location of three vanishing points on an image plane that contains the image 16 to the image processing engine 12, and causing the image processing engine 12 to automatically determine the position of the camera. In the example illustrated in FIG. 1, the image processing engine 12 includes a vanishing point calculation unit 32 to determine the position of each vanishing point in response to user input, and a camera position calculation unit 34 to determine the position of the camera based on the determined positions of the vanishing points. The techniques which the image processing engine 12 may implement are discussed in more detail below.

The determined position of the camera may be provided as a graphic indicator or as text (e.g., a set of global positioning service (GPS) coordinates) to the user via the user interface. Additionally or alternatively, the image processing engine 12 may provide the determined position of the camera to modules 40-1, 40-2, . . . 40-N for use in various modeling or mapping applications. For example, the module 40-1 is a three-dimensional model construction engine in which the determined position of the camera can be used to model an object depicted in the image 20 and apply appropriate portions of the image 20 as textures to the model, or to properly superimpose a model onto the image 20 so as to view the model and the objects in the image 20 in a same perspective view. As another example, the module 40-2 is a mapping service that utilizes the determined camera position so as to properly display the image 20 when a user views a geographic location in which the objects depicted in the image 20 are located.

To illustrate the operation of the image processing engine 12 more clearly, example images with different locations of the center of projection are discussed with reference to FIGS. 2 and 3. For ease of explanation, the images of FIGS. 2 and 3 are selected so that the projection of the object depicted in each image onto the respective image plane conforms to the so-called pinhole camera model, in which the camera is assumed to have no lens distortion other than perspective foreshortening.

Figure 2:
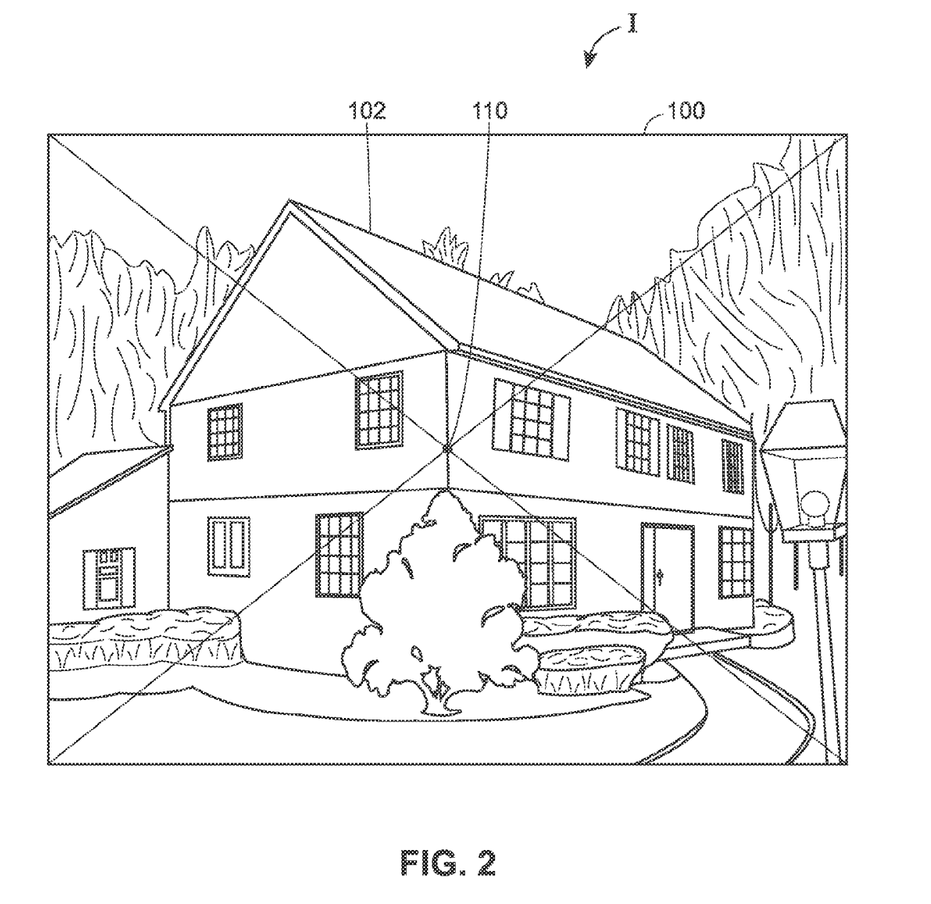
FIG. 2 is an example image in which the center of projection coincides with the center of the image.

Referring to FIG. 2, an example image 100 is a photograph of a building 102. The image 100 is a rectangular two-dimensional shape on an image plane I. In a three-dimensional object space O of the building 102 (i.e., the object in the example of FIG. 2), the building 102 includes mutually orthogonal lines. As is typical, the person who photographed the building 102 aimed the camera approximately at the center of the building 102. An optical axis of the camera intersects the image plane I at a center of projection 110 located substantially at the geometrical center of the image 100, i.e. on the intersection of the two diagonals of the image 100. Thus, the center of projection 110 can be calculated, for example, as a point having a coordinate corresponding to one half of the length of the image 100 and one half of the height of the image 100. In other words, the center of projection 110 can be easily determined based on the dimensions of the image 100 in the image plane I. The position of the camera relative to the building 102 then can be determined as being a point in the object space O of the building 102 at a distance d from the center of projection 110 along a line orthogonal to the image plane I.

Figure 3:
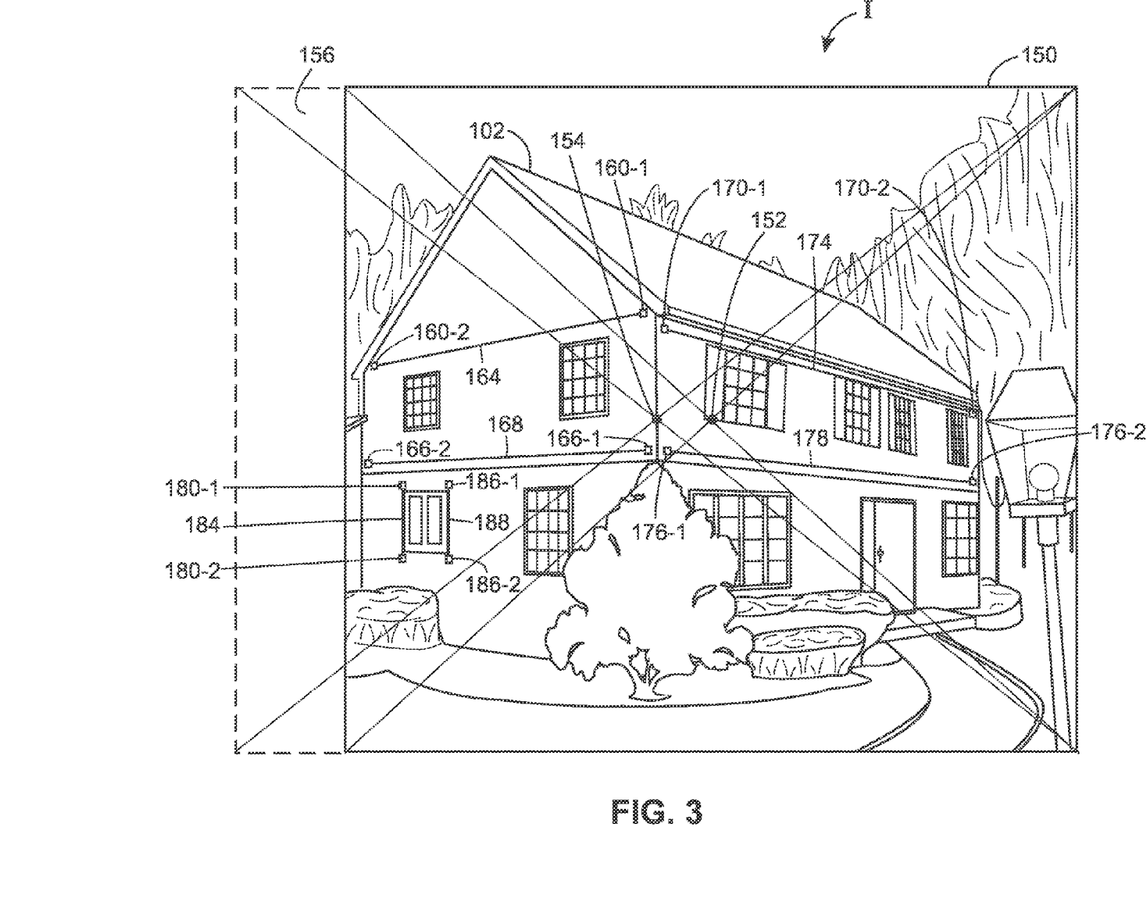
FIG. 3 is an example screenshot of a user interface on which an image is displayed, such that the center of projection of the image does not coincide with the center of the image.

On the other hand, the geometric center 152 of an example image 150 illustrated in FIG. 3 does not correspond to a center of projection 154, and thus the image 150 can be described as having a displaced center of projection. As a result, the center of projection 154 cannot be determined based on the length and the height of the image 150. According to one example scenario, the image 150 corresponds to a modified version of the image 100 discussed with reference to FIG. 2. Similar to the image 100, the image 150 depicts the building 102. However, a user in this scenario deliberately or inadvertently "crops" the image 100 so as to remove an area 156 and thereby reduce the length of the image 150. In other scenarios, the user otherwise modifies the image 100 without preserving the ratio between the dimensions of the image 100. Whereas the geometric center 152 of the image 150 is located on the intersection of the two diagonals of the image 150, the center of projection 154 remains on the intersection of the two diagonals of the original image 100 (that no longer has the same geometry as the image 150).

To locate the center of projection 154 of the image 150, the UI module 14 (or another module operating in the image processing system 10 or a similar system) may provide an interactive user interface including a set of controls to indicate the vanishing points in the projection of the building 102 onto the image plane I that includes the image 150. In particular, the interactive user interface may include moveable pins 160-1 and 160-2, using which the user may define a line 164, and moveable pins 166-1 and 166-2, using which the user may define a line 166. The user may inspect the image 150 and, in particular, the building 102 depicted in the image 150 to identify a pair of lines that are parallel in the object space O and position the pins 160-1, 160-2, 166-1, and 166-2 over the projection of these lines (which may be visible or invisible in the image 150) onto the image plane I. In an embodiment, the UI module 14 causes the lines 164 and 168 to be drawn on the user interface in response to the user positioning the moveable pins 160-1, 160-2, 166-1, and 166-

2. The lines 164 and 168 in the example of FIG. 3 are respective projections of parallel lines in the object space O on a plane $L_1$ that includes one of the faces of the building 102. Although the lines 164 and 168 correspond to parallel lines in the object space O and the plane $L_1$, the lines 164 and 168 intersect on the image plane I at a vanishing point $VP_1$ located outside the image 150.

Based on the positions of the moveable pins 160-1, 160-2, 166-1, and 166-2, the location of the vanishing point $VP_1$ (not shown in FIG. 3) may be automatically determined. For example, equations defining the lines 164 and 168 in a xy-coordinate system on the image plane I may be generated in the format $y=a_1x+b_1$ and $y=a_2x+b_2$, respectively, and solved together to determine the point of intersection of the lines 164 and 168 in the xy-coordinate system. Alternatively, any other suitable technique for determining where on the image plane I the lines 164 and 168 intersect can be used.

In a similar manner, the user can manipulate moveable pins 170-1 and 170-2 to define a line 174 and pins 176-1 and 176-2 to define a line 178. The lines 174 and 178 correspond to lines on a plane $L_2$ that is orthogonal to the plane $L_1$ in the object space O. On the image plane I, the lines 174 and 178 intersect at a vanishing point $VP_2$. Further, the user can manipulate moveable pins 180-1 and 180-2 to define a line 184 and pins 186-1 and 186-2 to define a line 188. The lines 184 and 188 correspond to respective lines on a plane $L_3$ that is orthogonal to each of the planes $L_1$ and $L_2$ in the object space O. On the image plane I, the lines 184 and 188 intersect at a vanishing point $VP_3$. The location of the vanishing points $VP_2$ and $VP_3$ can be determined using the same technique used to determine the vanishing point $VP_1$, for example, or another suitable technique.

Figure 4:
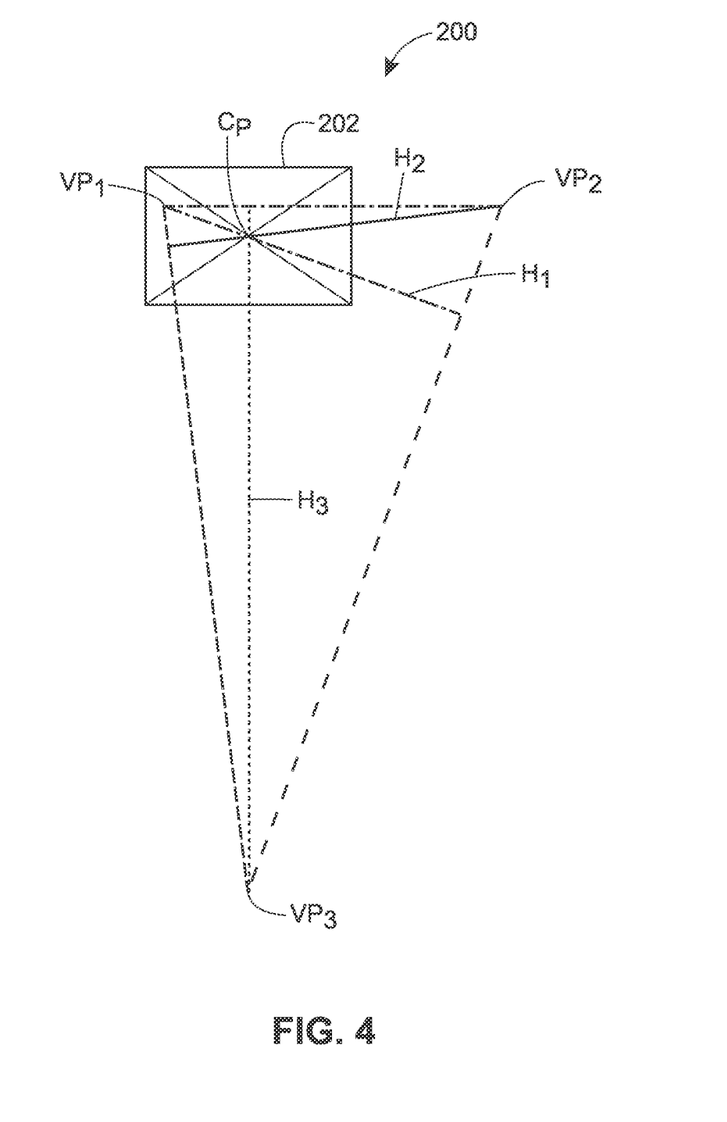
FIG. 4 is a diagram that illustrates example vanishing points on an image plane.
Figure 5:
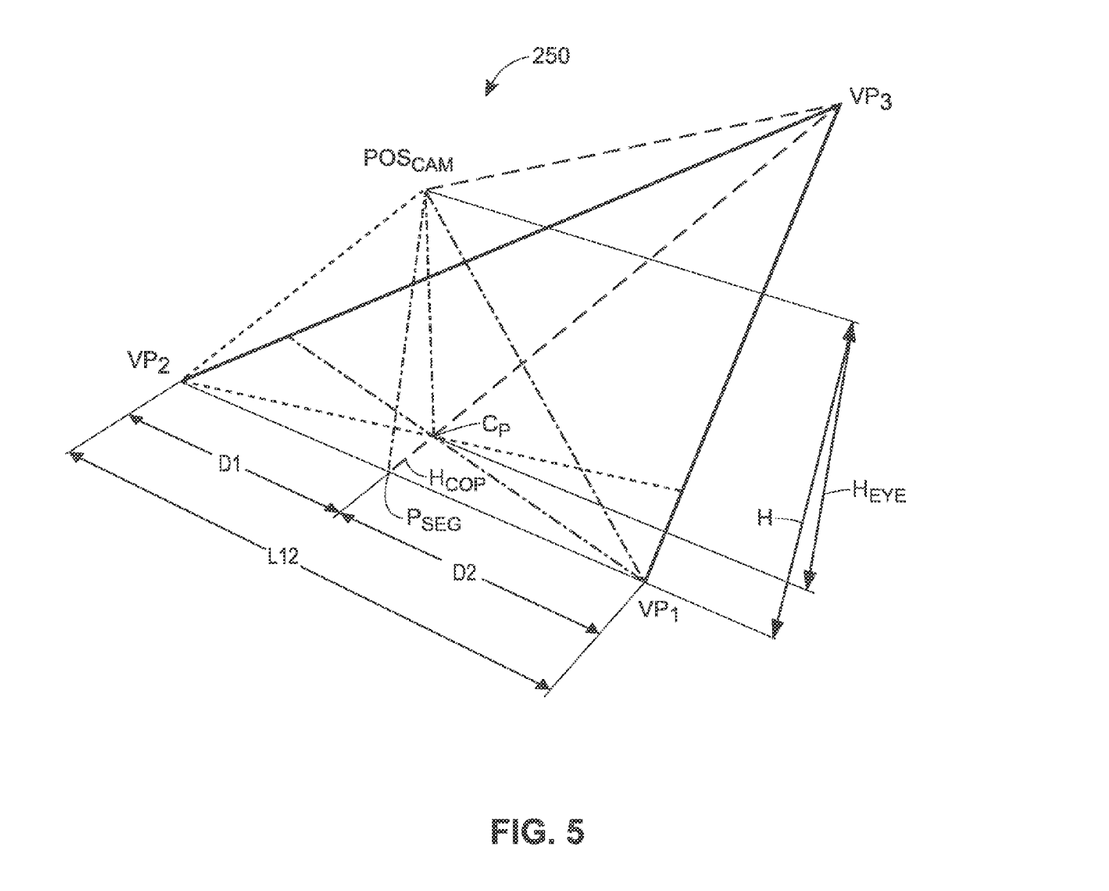
FIG. 5 is a diagram that illustrates example vanishing points on an image plane and a corresponding camera position in an object space.

Next, FIGS. 4 and 5 schematically illustrate a geometrical model according to which the image processing engine 12 (or another module) may determine the position of the camera relative to an object depicted in an image having a displaced center of projection, e.g., the building 102 depicted in the image 152.

Referring first to FIG. 4, a diagram 200 illustrates an image 202 in which the center of projection $C_P$ is determined based on the vanishing points $VP_1$, $VP_2$, and $VP_3$. In particular, the vanishing points $VP_1$, $VP_2$, and $VP_3$ are the vertices of a vanishing point triangle in which the center of projection $C_P$ coincides with the orthocenter of the vanishing point triangle, i.e., the point where each of the altitudes $H_1$, $H_2$, and $H_3$ (corresponding to the vertices $VP_1$, $VP_2$, and $VP_3$, respectively) intersect. The orthocenter of the vanishing point triangle can be determined using any suitable technique, such as by defining respective equations in the format an $y=ax+b$ for two of the altitudes $H_1$, $H_2$, and $H_3$ and solving the two equations together to determine the point at which the altitudes intersect.

In an embodiment, the image 202 is similar or identical to the image 100 discussed with reference to FIG. 2. As indicated above, if the dimensions of the image 202 are known, the center of projection $C_P$ can be determined by locating an intersection of the two diagonals of the image 202. However, in some scenarios, the image 202 is cropped or otherwise modified to generate a derived image, so that the dimensions of the original image 202 are no longer available.

Now referring to FIG. 5, the center of projection $C_P$, which may be determined as described with reference to FIG. 4, for example, can be used to determine the position of the camera $POS_{CAM}$ using a diagram 250. In particular, the position of the camera $POS_{CAM}$ in the diagram 250 defines an apex of a right tetrahedron in which a vanishing point triangle having vertices $VP_1$, $VP_2$, and $VP_3$ is a base, and the faces meeting at the apex $POS_{CAM}$ are mutually orthogonal. The projection of the apex $POS_{CAM}$ onto the image plane I that includes the vanishing point triangle corresponds to the center of projection $C_P$. It is noted that the center of projection $C_P$ coincides with the orthocenter of the vanishing point triangle.

Thus, the camera positioned at the apex $POS_{CAM}$ is on a line that is orthogonal to the image plane I including the vanishing point triangle and intersects the image plane I at the center of projection $C_P$ (that is also the orthocenter of the vanishing point triangle). The camera is positioned at a distance $H_{EYE}$ from the center of projection $C_P$. Therefore, the distance $H_{EYE}$ and the location (e.g., coordinates) of center of projection $C_P$, for example, unambiguously define the position of the camera. A line segment that passes through the center of projection $C_P$ perpendicularly intersects one of the base lines of the vanishing point triangle at a point $P_{SEG}$. In the example of FIG. 5, the point $P_{SEG}$ is on a line segment bounded by the vanishing points $VP_1$ and $VP_2$ and having a length $L_{12}$, also referred to below as the "line segment $VP_1VP_2$." Further, the line segment bounded by the center of projection $C_P$ and the point $P_{SEG}$ is referred to below as the "line segment $C_P P_{SEG}$" and has a length $H_{COP}$. Each of the lengths $L_{12}$ and $H_{COP}$ may be determined using any suitable technique based on the respective locations (e.g., coordinates) of the points $C_P$, $P_{SEG}$, $VP_1$, and $VP_2$. As also illustrated in FIG. 5, the point $P_{SEG}$ divides the line segment $C_P P_{SEG}$ into segments of lengths $D_1$ and $D_2$, respectively.

Further, a line segmented bounded by the apex $POS_{CAM}$ and the point $P_{SEG}$ has a length H. It is noted that the lengths H, $H_{EYE}$, and $H_{COP}$ correspond to respective sides of a right triangle, with the length H corresponding to the hypotenuse, and the lengths $H_{EYE}$ and $H_{COP}$ corresponding to the respective legs. In an embodiment, to determine $H_{EYE}$ (and thus determine the position of the camera), H and $H_{COP}$ are calculated first and $H_{EYE}$ then is calculated as:

$$H_{EYE} = \sqrt{(H^2 - H_{COP}^2)} \quad \text{(Eq. 1)}$$

As indicated above, $H_{COP}$ can be determined based on the locations of the vanishing points $VP_1$, and $VP_2$. To determine H, it is observed that a triangle with vertices $VP_1$, $P_{SEG}$, and $POS_{CAM}$ is similar to a triangle with vertices $POS_{CAM}$, $P_{SEG}$, and $VP_2$. Accordingly, $$H/D_1 = D_2/H \quad \text{(Eq. 2)}$$

and $$H = \sqrt{(D_1 D_2)} \quad \text{(Eq. 3)}$$

Thus, $H_{EYE}$ can be determined using the equations 1 and 3.

Figure 6:
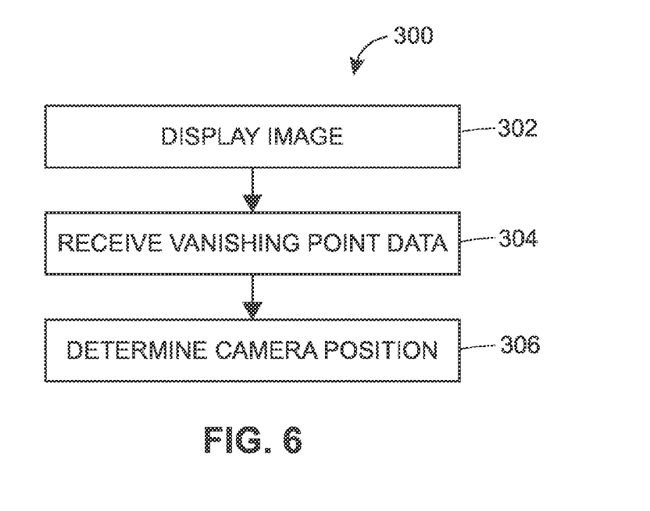
FIG. 6 is a flow diagram of a method for determining the position of a camera relative to an object depicted in an image, according to an embodiment.
Figure 7:
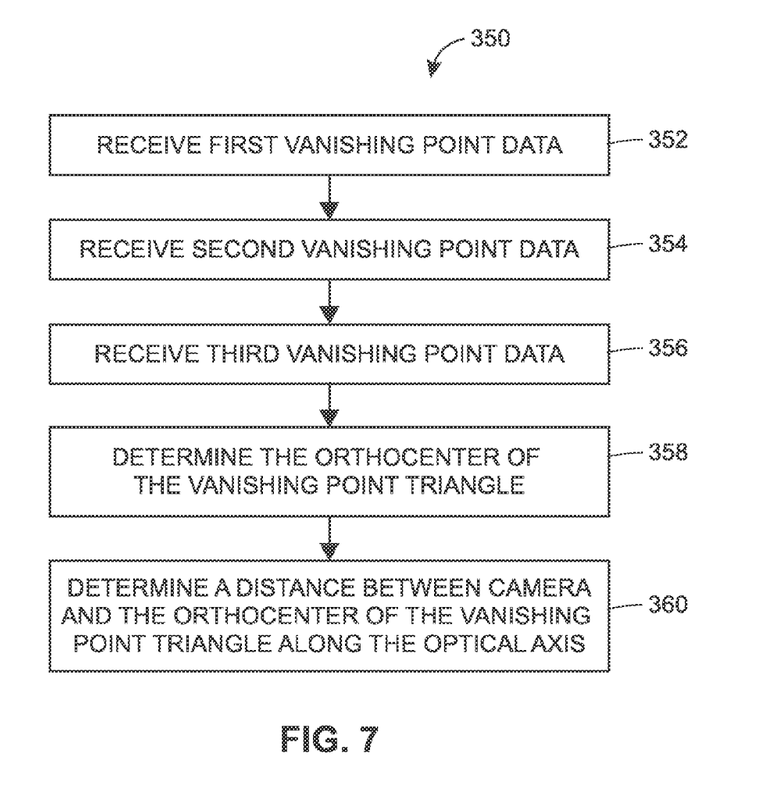
FIG. 7 is a flow diagram of a method for determining a position of a camera using the locations of three vanishing points.

Next, FIGS. 6 and 7 illustrate several example methods that may be implemented by the components discussed with reference to FIG. 1. As one example, the methods of FIGS. 6 and 7 may be implemented as computer programs stored on a tangible, non-transitory computer-readable medium (such as one or several hard disk drives) and executable on one or several processors. Further, although the methods of FIGS. 6 and 7 can be executed on individual computers, such as servers or PCs, it is also possible to implement at least some of these methods in a distributed manner using several computers, e.g., in a cloud computing environment.

FIG. 6 is a flow diagram of a method 300 for determining the position of a camera relative to an object depicted in an image, according to an embodiment. The method 300 may be implemented by the UI module 14 and the image processing engine 12, for example. In one such embodiment, the UI module 14 and the image processing engine 12 are computer programs executable on a personal computer. At block 302, an image is displayed via an interactive user interface on a display device such as a computer monitor, for example. Depending on the embodiment, the interface may be implemented in the window of a browser application, in a software application executing locally on a computing device, as a window of an software application executing remotely on a server and accessed from a workstation, etc. Referring back to FIG. 3, the image displayed at block 302 may be similar to the image 150, although in general the image may include any suitable object or a group of objects.

At block 304, vanishing point data is received from the user interface. For example, a user may activate and position moveable pins similar to the pins 160-1, 160-2, 166-1, 166-2, etc. discussed with reference to FIG. 3. To this end, the user may use a pointing device such as a mouse or a touchpad, for example. Upon positioning the moveable pins so as to indicate three vanishing by specifying three pairs of lines that are parallel in an object space but not parallel on an image plane (onto which an object in the object space is projected), the user may activate an appropriate control to cause the camera position to be determined. In an embodiment, after the user clicks on a "submit" button, the UI module 14 forwards the positions of the moveable pins on the interactive interface to the image processing engine 12. In response, the image processing engine 12 automatically determines the position of the camera used to capture the image based on the received vanishing point data. As one example, the technique discussed with reference to FIGS. 4 and 5 may be utilized.

FIG. 7 is a flow diagram of an example method 350 for determining a position of a camera using the locations of three vanishing points, according to an embodiment. The method 250 may be implemented in the image processing engine 12, for example. Further, in an embodiment, the method 350 is executed at blocks 304 and 306 of the method 300 discussed above.

At blocks 352, 354, and 356, first vanishing point data, second vanishing point data, and third vanishing point data, respectively, are received from an interactive user interface. The vanishing point data received at each of the blocks 352, 354, and 356 may include indications of positions of moveable pins. In response, the vanishing point calculation unit 32 (see FIG. 1) or another module may determine the position of each of the three vanishing points. For example, as indicated above, the vanishing point calculation unit 32 may generate and solve a pair of equations $y=a_1x+b_1$ and $y=a_2x+b_2$ for each of the first vanishing point data, the second vanishing point data, and the third vanishing point data. At block 358, an orthocenter of a vanishing point triangle defined by the three vanishing points is determined. The steps of block 358 may be implemented in the vanishing point calculation unit 32 or the camera position calculation unit 34, for example. In one embodiment, each of the vanishing points is represented by a pair of coordinates in an xy-plane, and the orthocenter is determined by calculating the coordinates of a point at which two altitudes of the vanishing point triangle intersect. Next, at block 360, the distance between the camera and the orthocenter of the vanishing point triangle determined at block 360 is calculated. To this end, the geometrical model of FIGS. 4 and 5, as well as the associated techniques, can be used. The steps of block 360 are implemented in the camera position calculation unit 34, according to an embodiment.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA), etc.). A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" along with its derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining a camera position for an image having a displaced center of projection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method implemented in a computing device for automatically determining a position of a camera relative to an object depicted in an image and captured using the camera, wherein the object is in an object space, wherein the image is on an image plane, and wherein a center of the image is not on an optical axis of the camera, the method comprising:
    causing the image to be displayed via a user interface of the computing device;
    receiving vanishing point data from the user interface, wherein the vanishing point data indicates a respective location on the image plane of each of a first vanishing point, a second vanishing point, and a third vanishing point; and
    automatically determining the position of the camera based on the first vanishing point, the second vanishing point, and the third vanishing point, wherein determining the position of the camera includes determining an orthocenter of a vanishing point triangle having vertices including the first vanishing point, the second vanishing point, and the third vanishing point, wherein the orthocenter of the vanishing point triangle is a point formed at an intersection of an altitude corresponding to the first vanishing point, an altitude corresponding to the second vanishing point, and an altitude corresponding to the third vanishing point, wherein the altitude corresponding to the first vanishing point is a line segment extending through the first vanishing point and perpendicular to a side of the vanishing point triangle that is opposite to the first vanishing point, wherein the altitude corresponding to the second vanishing point is a line segment extending through the second vanishing point and perpendicular to a side of the vanishing point triangle that is opposite to the second vanishing point, and wherein the altitude corresponding to the third vanishing point is a line segment extending through the third vanishing point and perpendicular to a side of the vanishing point triangle that is opposite to the third vanishing point, and wherein the optical axis of the camera intersects the image plane at the orthocenter of the vanishing point triangle.

2. The method of claim 1, wherein determining the position of the camera further includes:
    determining a distance $H_{COP}$ from the orthocenter of the vanishing point triangle to a line segment bounded by the first vanishing point and the second vanishing point, wherein a line perpendicular to the line segment that passes through the orthocenter of the vanishing point triangle divides the line segment into two sections of respective lengths $D_1$ and $D_2$ at a point $P_{SEG}$ on the line segment;
    determining a length H of a hypotenuse of a right triangle formed by the orthocenter of the vanishing point triangle, the point $P_{SEG}$, and the camera, wherein a line segment bounded by the point $P_{SEG}$ and the camera defines the hypotenuse, wherein the length $H=\sqrt{(D_1 D_2)}$; and
    determining a height $H_{EYE}$ of the right triangle based on the distance $H_{COP}$ and the length H.

3. The method of claim 1, wherein a projection of the object onto the image plane conforms to a pinhole camera model.

4. The method of claim 1, wherein the image is a cropped version of an original image, wherein a center of the original image is on the optical axis of the camera.

5. The method of claim 1, wherein at least a portion of the object is represented using mutually orthogonal lines.

6. The method of claim 1, wherein receiving vanishing point data includes:
    causing a first set of moveable pins to be displayed over the image, wherein the first set of moveable pins includes a first pair of pins to specify a first line on the image plane and a second pair of pins to specify a second line on the image plane;
    causing a second set of moveable pins to be displayed over the image, wherein the second set of moveable pins includes a third pair of pins to specify a third line on the image plane and a fourth pair of pins to specify a fourth line on the image plane; and
    causing a third set of moveable pins to be displayed over the image, wherein the third set of moveable pins includes a fifth pair of pins to specify a fifth line on the image plane and a sixth pair of pins to specify a sixth line on the image plane; and
    in response to a user positioning each of the first set of moveable pins, the second set of moveable pins, and the third set of moveable pins:
    automatically determining the first vanishing point, wherein the first vanishing point is at an intersection of the first line and the second line;
    automatically determining the second vanishing point, wherein the first vanishing point is at an intersection of the third line and the fourth line; and
    automatically determining the third vanishing point, wherein the third vanishing point is at an intersection of the fifth line and the sixth line.

7. A method implemented in a computing device, the method comprising:
    receiving first data indicative of a location of a first vanishing point on an image plane, wherein the image plane includes an image of an object;
    receiving second data indicative of a location of a second vanishing point on the image plane;
    receiving third data indicative of a location of a third vanishing point on the image plane;
    automatically determining an orthocenter of a vanishing point triangle having vertices that include the first vanishing point, the second vanishing point, and the third vanishing point, wherein the orthocenter of the vanishing point triangle is a point where an altitude corresponding to the first vanishing point, an altitude corresponding to the second vanishing point, and an altitude corresponding to the third vanishing point intersect, wherein the altitude corresponding to the first vanishing point is a line segment extending through the first vanishing point and perpendicular to a side of the vanishing point triangle that is opposite to the first vanishing point, wherein the altitude corresponding to the second vanishing point is a line segment extending through the second vanishing point and perpendicular to a side of the vanishing point triangle that is opposite to the second vanishing point, and wherein the altitude corresponding to the third vanishing point is a line segment extending through the third vanishing point and perpendicular to a side of the vanishing point triangle that is opposite to the third vanishing point;

automatically determining a position of a camera used to capture the image, wherein the camera is disposed on an optical axis orthogonal to the image plane and intersecting the image plane at the orthocenter of the vanishing point triangle; and determining a distance between the camera and the orthocenter of the vanishing point triangle along the optical axis.

8. The method of claim 7, wherein determining the distance between the camera and the orthocenter of the vanishing point triangle includes:

determining a distance $H_{COP}$ from the orthocenter of the vanishing point triangle to a line segment bounded by the first vanishing point and the second vanishing point, wherein a line perpendicular to the line segment that passes through the orthocenter of the vanishing point triangle divides the line segment into two sections of respective lengths $D_1$ and $D_2$ at a point $P_{SEG}$ on the line segment;

determining a length H of a hypotenuse of a right triangle formed by the orthocenter of the vanishing point triangle, the point $P_{SEG}$, and the camera, wherein a line segment bounded by the point PSEG and the camera defines the hypotenuse, wherein the length $H=\sqrt{(D_1 D_2)}$; and determining a height $H_{EYE}$ of the right triangle based on the distance $H_{COP}$ and the length H, wherein the height $H_{EYE}$ corresponds to the distance between the camera and the orthocenter of the vanishing point triangle.

9. The method of claim 7, wherein the object is in a three-dimensional object space, and wherein receiving each of the first data, the second data, and the third data includes:

receiving respective data descriptive of a projection of a respective pair of parallel lines in the object space onto the image plane, wherein the projection defines a respective pair of nonparallel lines in the image plane; and determining a respective intersection of the respective pair of non-parallel lines, wherein the intersection corresponds to a respective one of the first vanishing point, the second vanishing point, and the third vanishing point.

10. The method of claim 7, wherein a center of the image does not coincide with the orthocenter of the vanishing point triangle.

11. The method of claim 10, wherein the image is a cropped version of an original image, wherein a center of the original image coincides with the orthocenter of the vanishing point triangle.

12. The method of claim 7, wherein at least a portion of the object is represented using mutually orthogonal lines.

13. A non-transitory computer-readable medium having instructions stored thereon that, when executed by one or more processors, cause the one or more processors to:

cause an image depicting an object to be displayed via a user interface of a computing device, wherein the object is in an object space, wherein the image is on an image plane, and wherein a center of the image is not on an optical axis of a camera used to capture the image;

receive vanishing point data from the user interface, wherein the vanishing point data indicates a respective location on the image plane of each of a first vanishing point, a second vanishing point, and a third vanishing point; and determine a position of the camera relative to the object depicted in the image based on the first vanishing point, the second vanishing point, and the third vanishing point, wherein the position of the camera is based on an orthocenter of a vanishing point triangle having vertices that include the first vanishing point, the second vanishing point, and the third vanishing point, wherein the orthocenter of the vanishing point triangle is a point where an altitude corresponding to the first vanishing point, an altitude corresponding to the second vanishing point, and an altitude corresponding to the third vanishing point intersect, wherein the altitude corresponding to the first vanishing point is a line segment extending through the first vanishing point and perpendicular to a side of the vanishing point triangle that is opposite to the first vanishing point, wherein the altitude corresponding to the second vanishing point is a line segment extending through the second vanishing point and perpendicular to a side of the vanishing point triangle that is opposite to the second vanishing point, and wherein the altitude corresponding to the third vanishing point is a line segment extending through the third vanishing point and perpendicular to a side of the vanishing point triangle that is opposite to the third vanishing point.

14. The non-transitory computer-readable medium of claim 13, wherein the optical axis of the camera intersects the image plane at the orthocenter of the vanishing point triangle.

15. The non-transitory computer-readable medium of claim 14, wherein to determining the position of the camera, the instructions further cause the one or more processors to:

determine a distance $H_{COP}$ from the orthocenter of the vanishing point triangle to a line segment bounded by the first vanishing point and the second vanishing point, wherein a line perpendicular to the line segment that passes through the orthocenter of the vanishing point triangle divides the line segment into two sections of respective lengths $D_1$ and $D_2$ at a point $P_{SEG}$ on the line segment;

determine a length H of a hypotenuse of a right triangle formed by the orthocenter of the vanishing point triangle, the point $P_{SEG}$, and the camera, wherein a line segment bounded by the point $P_{SEG}$ and the camera defines the hypotenuse, wherein the length $H=\sqrt{(D_1 D_2)}$; and determine a height $H_{EYE}$ of the right triangle based on the distance $H_{COP}$ and the length H.

16. The non-transitory computer-readable medium of claim 13, wherein a projection of the object onto the image plane conforms to a pinhole camera model.

17. The non-transitory computer-readable medium of claim 13, wherein the image is a cropped version of an original image, wherein a center of the original image is on the optical axis of the camera.

18. The non-transitory computer-readable medium of claim 13, wherein at least a portion of the object is represented using mutually orthogonal lines.

19. The non-transitory computer-readable medium of claim 12, wherein to receive vanishing the point data from the user interface, the instructions further cause the one or more processors to:

cause a first set of moveable pins to be displayed over the image, wherein the first set of moveable pins includes a first pair of pins to specify a first line on the image plane and a second pair of pins to specify a second line on the image plane;

cause a second set of moveable pins to be displayed over the image, wherein the second set of moveable pins includes a third pair of pins to specify a third line on the image plane and a fourth pair of pins to specify a fourth line on the image plane; and cause a third set of moveable pins to be displayed over the image, wherein the third set of moveable pins includes a fifth pair of pins to specify a fifth line on the image plane and a sixth pair of pins to specify a sixth line on the image plane; and in response to a user positioning the first set of moveable pins, the second set of moveable pins, and the third set of moveable pins:

automatically determine the first vanishing point, wherein the first vanishing point is at an intersection of the first line and the second line;

automatically determine the second vanishing point, wherein the first vanishing point is at an intersection of the third line and the fourth line; and automatically determine the third vanishing point, wherein the third vanishing point is at an intersection of the fifth line and the sixth line.

20. A method implemented in a computing device for automatically determining a position of a camera relative to an object depicted in an image, wherein the object is in an object space, wherein the image is on an image plane, the method comprising:

causing the image to be displayed via a user interface of the computing device;

determining a first vanishing point from a first pair of lines displayed on the image plane, wherein the first vanishing point corresponds to an intersection of the first pair of lines on the image plane, wherein the first pair of lines correspond to a first set of moveable pins displayed over the image, wherein the first set of moveable pins includes a first pair of pins to specify a first line on the image plane and a second pair of pins to specify a second line on the image plane, and wherein the first pair of lines comprises the first line and the second line;

determining a second vanishing point from a second pair of lines displayed on the image plane, wherein the second vanishing point corresponds to an intersection of the second pair of lines on the image plane;

determining a third vanishing point from a third pair of lines displayed on the image plane, wherein the third vanishing point corresponds to an intersection of the third pair of lines on the image plane;

determining vanishing point data, wherein the vanishing point data indicates a respective location on the image plane of each of the first vanishing point, the second vanishing point, and the third vanishing point; and automatically determining the position of the camera based on the first vanishing point, the second vanishing point, and the third vanishing point.

21. The method of claim 20, wherein the first pair of lines are parallel lines in the object space.

22. The method of claim 20, wherein determining the position of the camera includes determining an orthocenter of a vanishing point triangle having vertices including the first vanishing point, the second vanishing point, and the third vanishing point, wherein the orthocenter of the vanishing point triangle is a point formed at an intersection of an altitude corresponding to the first vanishing point, an altitude corresponding to the second vanishing point, and an altitude corresponding to the third vanishing point, wherein the altitude corresponding to the first vanishing point is a line segment extending through the first vanishing point and perpendicular to a side of the vanishing point triangle that is opposite to the first vanishing point, wherein the altitude corresponding to the second vanishing point is a line segment extending through the second vanishing point and perpendicular to a side of the vanishing point triangle that is opposite to the second vanishing point, and wherein the altitude corresponding to the third vanishing point is a line segment extending through the third vanishing point and perpendicular to a side of the vanishing point triangle that is opposite to the third vanishing point.

* * * * *